United States Patent [19]

Kaiser et al.

[11] Patent Number: 6,067,041
[45] Date of Patent: May 23, 2000

[54] MOVING TARGET SIMULATOR

[75] Inventors: Stephen G. Kaiser, Hoffman Estates; Stuart J. Collar; Mark D. Hischke, both of Algonquin, all of Ill.

[73] Assignee: Northrop Grumman Corporation, Los Angeles, Calif.

[21] Appl. No.: 09/172,817

[22] Filed: Oct. 15, 1998

[51] Int. Cl.$^7$ ..................................................... G01S 7/40
[52] U.S. Cl. .......................... 342/171; 342/165; 342/169; 342/172; 434/2
[58] Field of Search .................... 342/165–174; 434/1–10

[56] References Cited

U.S. PATENT DOCUMENTS

| | | |
|---|---|---|
| 3,365,719 | 1/1968 | Williams . |
| 3,500,407 | 3/1970 | Thompson . |
| 3,906,500 | 9/1975 | Redman . |
| 4,070,769 | 1/1978 | Hollis . |
| 4,168,502 | 9/1979 | Susie . |
| 4,319,247 | 3/1982 | Warren . |
| 4,686,534 | 8/1987 | Eddy ........................................ 342/165 |
| 4,730,191 | 3/1988 | Groebke .................................. 342/169 |
| 5,047,782 | 9/1991 | Lew et al. ............................... 342/169 |
| 5,064,376 | 11/1991 | DeCrescent ................................ 434/2 |
| 5,223,840 | 6/1993 | Cronyn .................................... 342/170 |
| 5,431,568 | 7/1995 | Fey et al. .................................... 434/2 |
| 5,457,463 | 10/1995 | Vencel et al. ........................... 342/169 |
| 5,518,400 | 5/1996 | Otoide et al. ............................... 434/4 |

*Primary Examiner*—Bernarr E. Gregory
*Attorney, Agent, or Firm*—Terry J. Anderson; Karl J. Hoch, Jr.

[57] ABSTRACT

A moving target simulator for testing a radar system has a radio frequency receiver, a digital radio frequency memory in electrical communication with the radio frequency receiver for storing a signal received thereby, a digital delay circuit in electrical communication with the digital radio frequency memory for providing a time delay between reception and transmission of the radio frequency signal, an amplitude modulation circuit in electrical communication with the digital radio frequency memory for modulating an amplitude of the radio frequency signal, a Doppler modulation circuit in electrical communication with the digital radio frequency memory for providing a Doppler-modulated signal, and a radio frequency transmitter for transmitting the radio frequency signal after it has been delayed, amplitude-modulated, and/or Doppler-modulated.

15 Claims, 1 Drawing Sheet

MOVING TARGET SIMULATOR

FIELD OF THE INVENTION

The present invention relates generally to testing apparatus and methodology for radar systems. The present invention relates more particularly to a moving target simulator for testing a radar system by simulating a moving target from a stationary moving target simulator.

BACKGROUND OF THE INVENTION

Radar systems for detecting the presence, range, and bearing of various different targets such as aircraft (fixed and rotary wing, as well as missiles and the like), ground vehicles (trucks, tanks, armored troop transports, etc.), and marine vessels (such as surface ships and those submarines which are not submerged) are well known.

As those skilled in the art will appreciate, it is frequently necessary to test such radar systems, so as to provide a calibration of range and bearing therefore, as well as to insure the reliability thereof. One way of performing such a task is to use a stationary target, which may be moved during the test, so as to provide a radar return from a plurality of different ranges and bearings. However, as those skilled in the art will further appreciate, it is desirable to perform such testing upon a moving target, so as to better assure proper operation of the radar system. Indeed, such a moving target is required when testing Doppler radar systems.

One way to provide such a moving target according to contemporary methodology is to use a real aircraft, ground-base vehicle, or marine vehicle. In this manner, the target may be moved so as to provide different bearings and ranges and also so as to provide the necessary velocity for testing Doppler systems.

However, as those skilled in the art will appreciate, moving such a real target while maintaining the accuracy of its position and velocity parameters is extremely difficult. Such a test requires the coordination of many people (such as an aircraft or boat crew, for example) and also requires sophisticated, accurate, calibrated instrumentation for providing the necessary position and velocity information of the target.

In view of the foregoing, it will be appreciated that it is desirable to provide a moving target which is comparatively lightweight, portable, inexpensive, which requires comparatively few personnel to operate, and which simulates variations in range and velocity so as to simplify radar system testing.

SUMMARY OF THE INVENTION

The present invention specifically addresses and alleviates the above-mentioned deficiencies associated with the prior art. More particularly, the present invention comprises a moving target simulator for testing a radar system. The moving target simulator comprises a radio frequency receiver, a digital radio frequency memory in electrical communication with the radio frequency receiver for storing a signal received thereby, a digital delay circuit in electrical communication with the digital radio frequency memory for providing a time delay between reception and transmission of the radio frequency signal, an amplitude modulation circuit in electrical communication with the digital radio frequency memory for modulating an amplitude of the radio frequency signal, a Doppler modulation circuit in electrical communication with the digital radio frequency memory for providing a Doppler modulated signal, and a radio frequency transmitter for transmitting the radio frequency signal after it has been either delayed, amplitude modulated, or Doppler modulated.

Thus, according to the present invention, the moving target simulator delays and/or amplitude modulates the received radio frequency signal, i.e., the radar broadcast, so as to simulate a target having a desired range with respect to the radar system being tested. The moving target simulator also Doppler modulates the received radio frequency signal so as to simulate relative motion between the simulated target and the radar system being tested. In this manner, both the range and velocity parameters of the moving target being simulated are varied, as desired.

Thus, according to the present invention, the digital delay circuit, the amplitude modulation circuit, and the Doppler modulation circuit are configured to act upon a common radio frequency signal, i.e., that signal received from the radar system being tested, which is stored in the digital radio frequency receiver, so as to provide a delayed, amplitude modulated, Doppler modulated signal to the radio frequency transmitter of the moving target simulator.

The digital delay circuit, the amplitude modulation circuit, and the Doppler circuit are preferably configured so as to facilitate the definition of a radio frequency signal which is physically correlated to at least one radio frequency signal which was previously modified thereby. That is, according to the preferred embodiment of the present invention, a series of sequential radio frequency signals which are transmitted by the radio frequency transmitter of the moving target simulator of the present invention are correlated with one another, such that the simulated moving target defined thereby appears to be moving with linearly changing velocity and also such that a range of the simulated moving target appears to be changing in a manner which generally defines a parabola. In this manner, a realistic moving target is defined. As those skilled in the art will appreciate, those targets which do not move in such a realistic manner are frequently determined to be clutter by the radar system, and thus are not tracked. As such, it is desirable to provide a series of sequential radio frequency signals from the moving target simulator which behave in the manner of a real aircraft.

According to the preferred embodiment of the present invention, an Application Specific Integrated Circuit (ASIC) defines the radio frequency signal which is physically correlated to at least one radio frequency signal which was previously modified thereby. Those skilled in the art will appreciate that such an ASIC would provide the necessary processing power to generate a radio frequency signal having the necessary physical correlation parameters.

The digital delay circuit is preferably configured so as to modify an amplitude of the signal in a manner which closely approximates and simulates a Radar Cross-Section (RCS) of a moving target, such as an aircraft. Those skilled in the art will appreciate that the Radar Cross-Section (RCS) of such a moving target defines the amplitude of the radar return signal. Thus, by modifying the amplitude of the signal, the present invention facilitates the simulation of various different aircraft, each having its own, unique radar cross-section. The Radar Cross-Section (RCS) may also be varied so as to properly simulate various maneuvers and/or attitudes of the desired aircraft.

The digital delay circuit is preferably configured so as to modify the amplitude of the radar return signal so as to simulate a Radar Cross-Section (RCS) of a moving target according to a $R^{-4}$ characteristic of the two-way radar range equation. Those skilled in the art will appreciate that the two-way radar range equation defines the Radar Cross-Section (RCS) of a moving target in terms of the amplitude of the radar return signal therefrom according to principles which are well known in the art.

According to a preferred embodiment of the present invention, a computer, preferably a general purpose computer such as a Personal Computer, provides a user to find flight profile and controls the digital delay circuit, amplitude modulation circuit, and the Doppler modulation circuit, so as to simulate a target which is moving according to the user-defined profile. The digital delay circuit, the amplitude modulation circuit, and the Doppler modulation circuit are all preferably configured so as to simulate two, separate, distinct moving targets. In this manner, two different aircraft may be simulated by the moving target simulator of the present invention. Preferably, the present invention is configured so as to simulate two aircraft, wherein each aircraft has distinctly different characteristics (resulting in distinctly different Radar Cross-Sections), and wherein each different aircraft flies according to a different flight profile, i.e., follows a different flight path.

According to the present invention, a method for testing a radar system comprises the steps of disposing a moving target simulator in a field of view of the radar system being tested, transmitting a radio frequency signal, i.e., a radar broadcast, from the radar system to the moving target simulator, receiving the radio frequency signal via a radio frequency receiver of the moving target simulator, and transmitting a return signal from the moving target simulator back to the radar system such that the transmitted radio frequency signal simulates at least one, preferably two, moving targets.

The moving target simulator performs this process for delaying the received radio frequency signal, modulating an amplitude of the received radio frequency signal, and/or Doppler modulating the received radio frequency signal. In this manner, one or more targets is simulated having the desired Radar Cross-Section (RCS) and slang according to a desired flight profile.

Those skilled in the art will appreciate that frequently it is necessary to delay the signal, modulate the amplitude of the signal, and Doppler modulate the signal in order to achieve the desired Radar Cross-Section (RCS) and flight profile. Thus, all of these processes will frequently be occurring simultaneously, upon any given re-transmitted radio frequency signal in order to achieve the desired simulation of a moving target thereby.

As discussed above, the returned radar signal is physically correlated to a previous re-transmitted radar signal by physically correlating the delayed, amplitude modulated, and/or Doppler modulated signal to at least one radio frequency signal which was previously defined by the moving target simulator, such that the simulated moving target defined thereby appears to be moving with linearly changing velocity and a range of a the simulated moving target appears to be changing in a manner which generally defines a parabola. Then, the Radar Cross-Section (RCS) of the simulated moving target is defined by modulating an amplitude of the radar return, so as to simulate the desired type of target, i.e, the particular aircraft, as well as its attitude with respect to the radar system being tested. The Radar Cross-Section (RCS) of the signal is defined by modifying the amplitude of the return signal according to the $R^{-4}$ characteristic of the two-way radar range equation. The returned radar signal may also be purposefully uncorrelated to a previously re-transmitted radar signal to test a radar for its sensitivity to unrealistic targets.

The method for simulating a moving target according to the present invention preferably further comprises providing a user-defined flight profile to a computer and controlling the delay, the amplitude, and/or the frequency of the radio frequency signal transmitted back to the radar system, so as to simulate movement of the target according to the desired user defined profile.

Thus, according to the present invention, a radio frequency signal from the radar system is modified by performing at least one process, such as delaying the radio frequency signal, modifying an amplitude of the radio frequency signal, or modifying a frequency of the radio frequency signal, so as to simulate the desired moving target and its flight path. Preferably, the method comprises simulating a plurality of such targets in a like manner.

Thus, according to the present invention, an inexpensive, lightweight moving target simulator which requires few personnel to transport and operate, and which also provides the sophistication necessary to adequately simulate a desired moving target traveling along a user-defined flight path is provided as well as providing a means of testing system sensitivity to unrealistic targets.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention.

Figure 1:
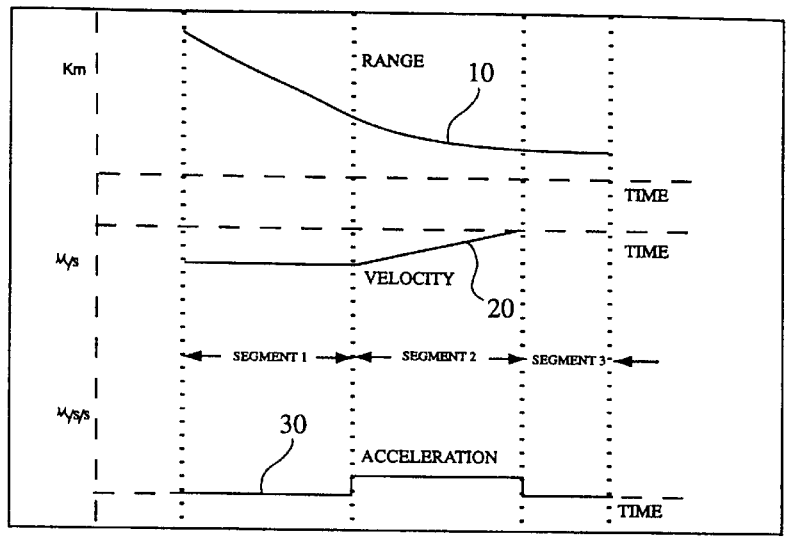
FIG. 1 is a graph showing the range, velocity, and acceleration correlation of a simulated moving target according to the present invention.
Figure 2:
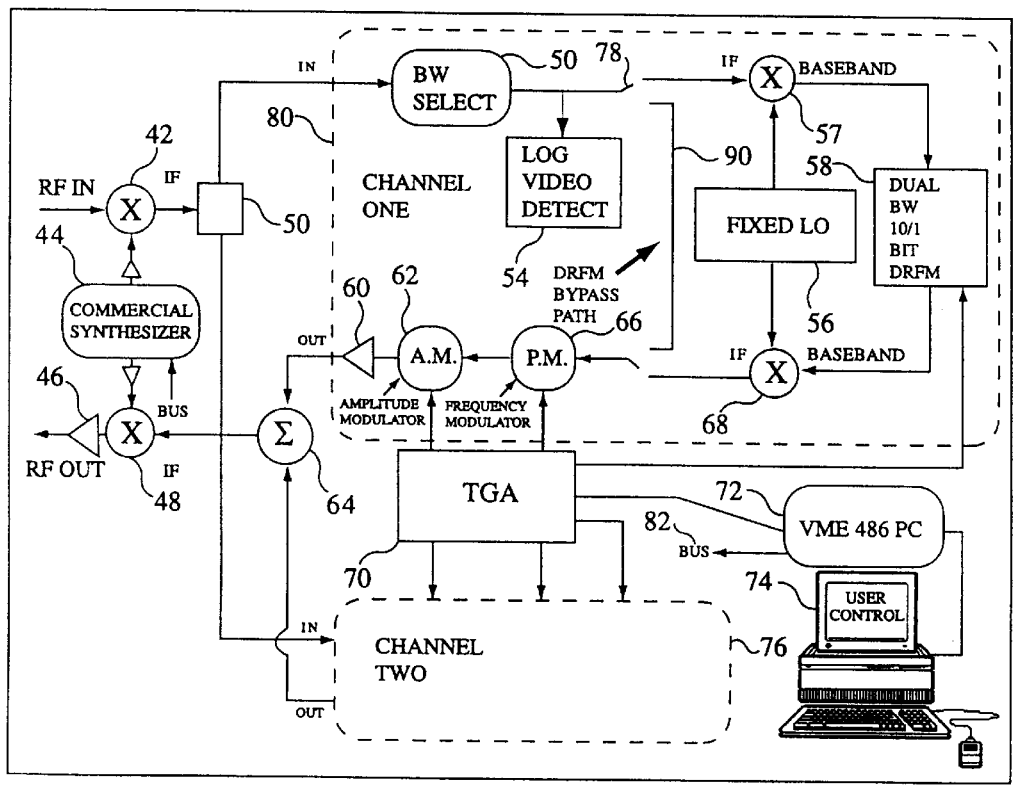
FIG. 2 is a system block diagram of the moving target simulator of the present invention.

The moving target simulator of the present invention is illustrated in FIGS. 1 and 2 which depict a presently preferred embodiment thereof.

The moving target simulator of the present invention is a digital radio frequency memory base, radio frequency repeater which provides digital delay, amplitude modulation, and Doppler modulation of at least two independent channels. The moving target simulator of the present invention thus provides means for simulating two moving targets, each having a unique Radar Cross-Section and each following a separate flight path. The moving target simulator of the present invention may thus be utilized to characterize either military or commercial radar systems.

In use, the moving target simulator is positioned in the field of view of the radar system being tested. There, it intercepts the incoming radar signal, modulates the range or delay, amplitude, and Doppler return of the intercepted radar signal, and subsequently re-transmits the modulated radar signal back to the radar system being tested. As those skilled in the art will appreciate, the radar system being tested cannot distinguish such a simulated target from a real moving target which is within the radar system's field of view.

Referring now to FIG. 1, the moving target system of the present invention has the unique capability to modulate all three radar characteristics, i.e., time delay, amplitude, and frequency, of the intercepted radar pulse in a physically correlated manner. That is, the sequential string of such intercepted pulses is processed in such a manner as to provide physical correlation between the process. In this manner, a simulated target moving with a constant acceleration 30 will move with linearly changing velocity 20. Similarly, the range 10 will change in a parabolic manner with respect to time. This correlation is calculated and applied to the simulated target in real time, preferably by an Application Specific Integrated Circuit (ASIC) which is developed specifically for this purpose.

Additionally, the moving target simulator of the present invention is capable of applying amplitude correlation to the intercepted signal in a manner which simulates the true Radar Cross-Section (RCS) of a moving target according to the $R^{-4}$ characteristic of the well known two-way radar range equation.

As those skilled in the art will appreciate, such correlated modulation techniques are required so as to properly simulate moving targets and thus deceive contemporary radar systems into accepting the simulated target as a real target. For example, it is well known that modern Doppler systems will reject velocity targets as clutter if the range return of the target does not move in the physically correlated fashion as described above.

In addition to providing correlated signals for simulation purposes, the preferred embodiment of the present invention may also generate purposeful uncorrelated signals. Uncorrelated signals provide the capability to test a radar for its sensitivity to unrealistic targets.

According to the preferred embodiment of the present invention, the delay, amplitude, and Doppler modulation of the simulated target can be varied according to a user-defined flight profile, which is preferably created and/or stored in an MS-DOS or PC type of computer. Thus, according to the present invention, the moving target simulator further comprises a Personal Computer which may be used to define a flight profile and within which the flight profile is stored so as to subsequently control the circuits which define the delay, amplitude, and Doppler modulation of simulated targets.

According to the preferred embodiment of the present invention, a graphical user interface is provided so as to aid the user in developing such flight test scenarios. Preferably, the computer control and user interface are facilitated via the use of a keyboard and either a track ball, mouse, or the like.

According to the preferred embodiment of the present invention, an external signal generator such as an HP-8672A is required for providing the local oscillator signal for the first RF conversion. This synthesizer is preferably controlled by the Personal Computer via a GPIB (IEEE-488) connection.

The moving target system of the present invention provides, among others, the following unique features: correlated range vs. velocity flight profiles; correlated range vs. amplitude flight profiles; unique graphical user interface for creating segmented flight scenarios; linked list storage of flight scenarios on a DOS-compatible hard disk; repeatable flight scenarios recallable from a DOS-formatted hard disk; multiple simultaneous range targets per channel; multiple simultaneous velocity targets per channel; and superposition of complex helicopter or Jet Engine Modulation (JEM) output spectrum upon the simulated target return. These features are discussed in detail below.

The moving target system of the present invention provides a simulated moving target with a velocity which is equal to the rate of change of its range. Realistic moving targets must move such that their instantaneous velocity is the time derivative of their range. Targets which are not correlated in this fashion may be rejected as clutter by modern Doppler radar systems.

The moving target simulator provides a simulated moving target with an amplitude which is proportional to its range. The amplitude of a radar return from a realistic moving target will decrease at a rate proportional to $R^{-4}$, where R is the range from the radar system being tested.

The moving target simulator flight scenarios are preferably created via the use of a unique, easy-to-use graphical user interface, as discussed above. The flight scenario is preferably built up in a piece-wise fashion from individual segments. Each segment thereby defines one linear velocity portion of the overall flight profile. The profiles are then stored in an ASCII file on a DOS disk. The list of the flight profile, and the corresponding simulation, is limited only by the storage capacity of the disk.

The moving target simulator flight scenarios of the present invention are thus built up in segments. Each segment defines one linear velocity portion of the simulation. When the target changes direction or speed, a new velocity segment is defined. A linked list is created in an ASCII file which stores the moving target parameters for each segment. The number of segments linked in the list is only limited by the storage capacity of the DOS disk.

Each time a flight simulation is run, the moving target parameters are recalled from the DOS disk and are loaded into the moving target simulator hardware. This allows a level of repeatable testing of radar parameters which cannot be duplicated by fly-bys utilizing real targets. In this manner, a predefined flight scenario may be recalled and played over and over again. This repeatability allows the accurate comparison of radar parameters over time and from unit to unit.

Each independent channel of the moving target simulator of the present invention is preferably capable of generating multiple simultaneous range targets. This is accomplished by replicating the intercepted radar pulse multiple times for each received pulse and then retransmitting each individual pulse at a different time, i.e., with a different delay.

Each independent channel of the moving target simulator of the present invention is preferably capable of generating multiple simultaneous velocity targets. This is accomplished by generating multiple Doppler frequency offsets from the received radar frequency. The amplitude of each Doppler target can thus be controlled independently.

The moving target simulator is preferably capable of superimposing a complex frequency response onto an intercepted radar signal. The response is stored in a look-up table. The response may be completely arbitrary in magnitude and phase. This mode is typically used to simulate the radar signature of a helicopter or Jet Engine Modulation (JEM) lines.

The moving target simulator may be used for the testing of either commercial or military radar systems, as desired. Because the moving target simulator of the present invention is a radio frequency repeater with a built-in receiver and transmitter, it does not require any special interface to the radar system being tested. Thus, the test is performed in a completely non-invasive manner and in real time.

Referring now to FIG. 2, a block diagram of the moving target simulator of the present invention is shown. Two complete Intermediate Frequency/Digital Radar Frequency Modulation (IF/DRFM) channels 76, 80 are provided. Each IF/DRFM channel is identical and is completely independent from the other channels. The Techniques Generator ASIC (TGA) controller 70 is a two-channel device.

The RF signal is converted into an IF frequency and then split into two channels by splitter 50. After conversion, the Intermediate Frequency signal is processed by the respective digital radar frequency modulator 76, 80, Doppler modulator Phase Modulator 66, and amplitude attenuator or modulator 62. The IF output signal from each channel are then recombined via summer 64 and reconverted to RF via mixer 48 and then provided to power amplifier 46 for re-transmission.

A Digital Radio Frequency Memory (DRFM) bypass path 90 is provided in the Intermediate Frequency circuit. This path allows the system to produce a very small time delay, as will be required in the simulation of a target which is very close to the radar system being tested. Also, the Doppler modulator 66 and the attenuator or amplitude modulator 62 remain in the circuit whether or not the DRFM 58 is bypassed. This allows the Doppler modulator 66 and the amplitude modulator 62 to operate with minimal time delay when range simulation is not required.

The DRFM 58 provides high fidelity coherent recording and playback of digitized radio frequency signals. The DRFM 58 provides precise programmed digital delays of the recorded signal in a manner which simulates the range delay of a moving target. The DRFM 58 of the present invention preferably operates in two programmable bandwidths, e.g., 20 MHz or 100 MHz. The TGA controller 70 is a two-channel device which provides timing and control strobes to the DRFMs 58, Doppler modulators 66, and amplitude modulators 62 for each channel. The TGA controller 70 preferably comprises an Application Specific Integrated Circuit (ASIC) which also provides the correlation function for the range and velocity response of the system.

The DRFM 58, TGA 70, computer 74, and other miscellaneous digital functions reside on the VME boards in a 19-inch subrack enclosure. The IF, video, and Doppler modulation subsystems preferably reside upon custom printed circuit boards mounted within the rear of the subrack enclosure.

In order to provide broad band tuning capability, the system pre-selectors/post-selectors are not included in the moving target simulator DRFMs 58. A commercial microwave synthesizer, such as an HP-8672A is preferably used to turn the DRFMs 58 to the radar's operating frequency. This synthesizer is preferably controlled by the embedded computer via a GPIB (IEEE-488) bus. The radio frequency conversion mixer 48, amplifiers 46, splitter 50, and power summer 64 are preferably contained within the subrack enclosure along with other circuitry.

The moving target simulator of the present invention thus provides the unique capability to simulate the motion of real physical targets to a contemporary radar system under tests. The simulated targets appear to move according to physically correlated range, velocity, and acceleration, as discussed above. The moving target simulator repeater provides this capability non-invasively to the radar system under test, thus making the test setup simple, convenient, and inexpensive.

Thus, the moving target simulator of the present invention provides a low-cost alternative to traditional flight test techniques for characterizing commercial and military radar performance. The simulated flight scenarios are digitally controlled and timed both for accuracy and repeatability. The graphical user interface provides an easy to use control interface for the system. Predefined flight profiles may be played out interactively, so as to test radar's performance over time, or so as to compare the performance of one radar unit to another.

It is understood that the exemplary moving target simulator described herein and shown in the drawings represents only a presently preferred embodiment of the invention. Indeed, various modifications and additions may be made to such embodiment without departing from the spirit and scope of the invention. For example, the present invention may find application in other communications-related test systems. For example, a two-channel repeater with programmable delay may be applicable to multipath simulations for cellular phone systems. Thus, these and other modifications and additions may be obvious to those skilled in the art and may be implemented so as to adapt the present invention for use in a variety of different applications.

What is claimed is:

1. A moving target simulator for testing a radar system, the moving target simulator comprising:

a) a radio frequency receiver;

b) a digital radio frequency memory in electrical communication with the radio frequency receiver for storing a signal received thereby;

c) a digital delay circuit in electrical communication with the digital radio frequency memory for providing a time delay between reception and transmission of the radio frequency signal;

d) an amplitude modulation circuit in electrical communication with the digital radio frequency memory for modulating an amplitude of the radio frequency signal;

e) a Doppler modulation circuit in electrical communication with the digital radio frequency memory for providing a Doppler modulated signal;

f) said digital delay circuit, amplitude modification circuit and Doppler modification circuits defining a correlated frequency signal to generate a simulated target with simulated linearly changing velocity wherein the simulated range chances parabolically; and g) a radio frequency transmitter for transmitting the correlated radio frequency signal.

2. The moving target simulator as recited in claim 1, wherein the digital delay circuit, the amplitude modulation circuit, and the Doppler modulation circuit operate from a common radio frequency signal from the digital radio frequency receiver to provide a delayed, amplitude modulated, Doppler modulated signal to the radio frequency transmitter.

3. The moving target simulator as recited in claim 1, further comprising an application specific integrated circuit for defining of a radio frequency signal which is correlated to previously processed radio frequencies, such that a simulated moving target defined thereby appears to a radar system to be moving with linearly changing velocity.

4. The moving target simulator as recited in claim 1, wherein the digital delay circuit is configured to modify an amplitude of the signal to simulate a radar cross section of a moving target.

5. The moving target simulator as recited in claim 1, wherein the digital delay circuit is configured to modify an amplitude of the signal to simulate a radar cross section of a moving target according to a $R^{-4}$ characteristic of a two way radar range equation.

6. The moving target simulator as recited in claim 1, further comprising a computer for providing a user defined flight profile and for controlling the digital delay circuit, the amplitude modulation circuit, and the Doppler modulation circuit to simulate a target which is moving according to a user defined flight profile.

7. The moving target simulator as recited in claim 1, wherein the digital delay circuit, the amplitude modulation circuit, and the Doppler modulation circuit are capable of simulating two moving targets.

8. A method for testing a radar system, the method comprising the steps of:
   a) disposing a moving target simulator in a field of view of the radar system;
   b) transmitting a radio frequency signal from the radar system to the moving target simulator;
   c) receiving the radio frequency signal via a radio frequency receiver of the moving target simulator;
   d) the moving target simulator performing the following:
      i) delaying the signal;
      ii) modulating an amplitude of the signal;
      iii) Doppler modulating in the signal;
      iv) correlating a resulting signal to define a simulated target with simulated linearly changing velocity and simulated chance in range parabolically; and
   e) transmitting the delayed, amplitude, and/or Doppler modulated signal from the moving target simulator back to the radar system, the transmitted radio frequency signal simulating a moving target.

9. The method as recited in claim 8, further comprising the step of using an application specific integrated circuit to define a radio frequency signal which is correlated to previously processed radio signals, such that a simulated moving target defined thereby appears to be moving with linearly changing velocity.

10. The method as recited in claim 8, further comprising the step of modifying an amplitude of the signal to simulate a radar cross section of a moving target.

11. The moving target simulator as recited in claim 8, further comprising the step of modifying an amplitude of the signal to simulate a radar cross section of a moving target according to a $R^{-4}$ characteristic of a two way radar range equation.

12. The moving target simulator as recited in claim 8, further comprising the steps of:
   a) providing a user defined flight profile to a computer; and
   b) controlling the delay, the amplitude, and the frequency of the radio frequency signal transmitted back to the radar system so as to simulate movement of the target according to the user defined profile.

13. A method for testing a radar system, the method comprising the steps of:

a) receiving a radio frequency signal from the radar system;
   b) modifying the received radio frequency signal by performing the following upon the radio frequency signal:
      i) delaying the radio frequency signal;
      ii) modifying an amplitude of the radio frequency signal;
      iii) modifying a frequency of the radio frequency signal;
      iv) correlating a resulting signal to define a simulated target with simulated linearly changing velocity and simulated change in range parabolically; and
   c) transmitting the correlated radio frequency signal back to the radar system so as to simulate a moving target.

14. A method for testing a radar system, the method comprising the steps of:
   a) receiving a radio frequency signal from the radar system;
   b) modifying the received radio frequency signal by performing the following upon the radio frequency signal so as to form two separate return radio frequency signals:
      i) delaying the radio frequency signal;
      ii) modifying an amplitude of the radio frequency signal;
      iii) modifying a frequency of the radio frequency signal;
      iv) correlating a resulting signal to define a simulated target with simulated linearly changing velocity and simulated chance in range parabolically; and
   c) transmitting the two modified radio frequency signals back to the radar system so as to simulate two moving targets.

15. A method for testing a radar system, the method comprising the steps of:
   a) receiving a radio frequency signal from the radar system;
   b) modifying the received radio frequency signal by performing one or more of the following upon the radio signal so as to generate a signal that does not correlate to any known target:
      i) delaying the radio frequency signal;
      ii) modifying an amplitude of the radio frequency signal; and
      iii) modifying a frequency of the radio frequency signal;
   c) transmitting the uncorrelated radio signal frequency back to the radar system to facilitate testing for erroneous targets.

* * * * *